US011991016B2

United States Patent
Chau

(10) Patent No.: US 11,991,016 B2
(45) Date of Patent: *May 21, 2024

(54) CONFERENCE TRANSCRIPTION EVALUATION FOR ALERTING CONFERENCE PARTICIPANTS OF DISCUSSION CHANGES

(71) Applicant: Zoom Video Communications, Inc., San Jose, CA (US)

(72) Inventor: Vi Dinh Chau, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,319

(22) Filed: Jun. 30, 2022

(65) Prior Publication Data

US 2023/0032769 A1 Feb. 2, 2023

Related U.S. Application Data

(63) Continuation of application No. 17/390,735, filed on Jul. 30, 2021, now Pat. No. 11,381,412.

(51) Int. Cl.
*H04L 12/18* (2006.01)
*G06F 40/58* (2020.01)

(52) U.S. Cl.
CPC .......... *H04L 12/1831* (2013.01); *G06F 40/58* (2020.01)

(58) Field of Classification Search
None
See application file for complete search history.

(56) References Cited

U.S. PATENT DOCUMENTS

| | | | |
|---|---|---|---|
| 6,343,313 B1 | 1/2002 | Salesky et al. | |
| 7,945,619 B1 | 5/2011 | Chawla et al. | |
| 8,395,656 B1 | 3/2013 | Malzbender et al. | |
| 8,750,472 B2 | 6/2014 | Shun et al. | |
| 9,363,093 B2 | 6/2016 | Givental et al. | |
| 9,955,116 B2 | 4/2018 | Givental et al. | |
| 9,977,574 B2 | 5/2018 | Quinn et al. | |
| 10,453,355 B2 | 10/2019 | Ashbrook | |
| 10,798,341 B1 | 10/2020 | Hegde et al. | |
| 11,381,412 B1 * | 7/2022 | Chau | H04L 12/1831 |
| 2003/0128987 A1 | 7/2003 | Mayer | |

(Continued)

*Primary Examiner* — Antim G Shah
(74) *Attorney, Agent, or Firm* — Young Basile Hanlon & MacFarlane, P.C.

(57) ABSTRACT

A conference participant is alerted as to an event during a conference responsive to a determination that a focus of the conference participant is other than on the conference. During the conference, an event associated with the conference participant is detected based on a real-time transcription of the conference. For example, the event may relate to a topic relevant to the conference participant or a request associated with a name of the conference participant. A determination is made that a focus of the conference participant is other than on the conference based on information associated with a device of the conference participant, such as input received from a camera associated with the device or a setting of an audio output device associated with the device. Based on that determination and the detected event, output is presented to alert the conference participant as to the event.

20 Claims, 8 Drawing Sheets

(56) References Cited

U.S. PATENT DOCUMENTS

| | | |
|---|---|---|
| 2004/0042103 A1 | 3/2004 | Mayer |
| 2008/0062250 A1 | 3/2008 | Rye et al. |
| 2009/0003560 A1 | 1/2009 | Katis et al. |
| 2011/0153768 A1 | 6/2011 | Carter et al. |
| 2011/0196930 A1 | 8/2011 | Chawla et al. |
| 2011/0267419 A1 | 11/2011 | Quinn et al. |
| 2013/0290434 A1 | 10/2013 | Bank et al. |
| 2014/0063174 A1 | 3/2014 | Junuzovic et al. |
| 2014/0186010 A1 | 7/2014 | Guckenberger et al. |
| 2015/0012270 A1 | 1/2015 | Reynolds |
| 2016/0073054 A1* | 3/2016 | Balasaygun ........ H04L 12/1813 348/14.08 |
| 2016/0234268 A1* | 8/2016 | Ouyang ................ H04L 67/54 |
| 2016/0323333 A1 | 11/2016 | Aggarwal et al. |
| 2016/0344779 A1 | 11/2016 | Jain et al. |
| 2017/0282079 A1 | 10/2017 | De La Cruz |
| 2017/0359393 A1 | 12/2017 | Rajagopal et al. |
| 2020/0019643 A1 | 1/2020 | Roy et al. |
| 2020/0153647 A1* | 5/2020 | Jouhikainen ........ H04L 12/1818 |
| 2020/0153915 A1 | 5/2020 | Jain et al. |
| 2020/0403817 A1* | 12/2020 | Daredia ............. H04L 12/1822 |
| 2021/0397402 A1 | 12/2021 | Ashkenazi et al. |
| 2022/0060525 A1* | 2/2022 | Chavez ............... G06V 40/176 |
| 2022/0078038 A1 | 3/2022 | Dandapani et al. |

* cited by examiner

CONFERENCE TRANSCRIPTION EVALUATION FOR ALERTING CONFERENCE PARTICIPANTS OF DISCUSSION CHANGES

CROSS-REFERENCE TO RELATED APPLICATION(S)

This disclosure is a continuation of U.S. patent application Ser. No. 17/390,735, filed Jul. 30, 2021, the entire disclosure of which is herein incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for conference event alerting based on participant focus.

One aspect of this disclosure is a method, which includes detecting an event associated with a conference participant during a conference based on a real-time transcription of the conference, and, responsive to determining that a focus of the conference participant is other than on the conference based on information associated with a device of the conference participant, presenting output to alert the conference participant as to the event.

Another aspect of this disclosure is an apparatus, which includes a memory and a processor configured to execute instructions stored in the memory to detect an event associated with a conference participant during a conference based on a real-time transcription of the conference, and present output to alert the conference participant as to the event based on a determination that a focus of the conference participant is other than on the conference.

Yet another aspect of this disclosure is a non-transitory computer readable medium storing instructions operable to cause one or more processors to perform operations, which include detecting an event during a conference based on a real-time transcription of the conference, determining that a focus of a conference participant of the conference is other than on the conference, and presenting output to alert the conference participant as to the event.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
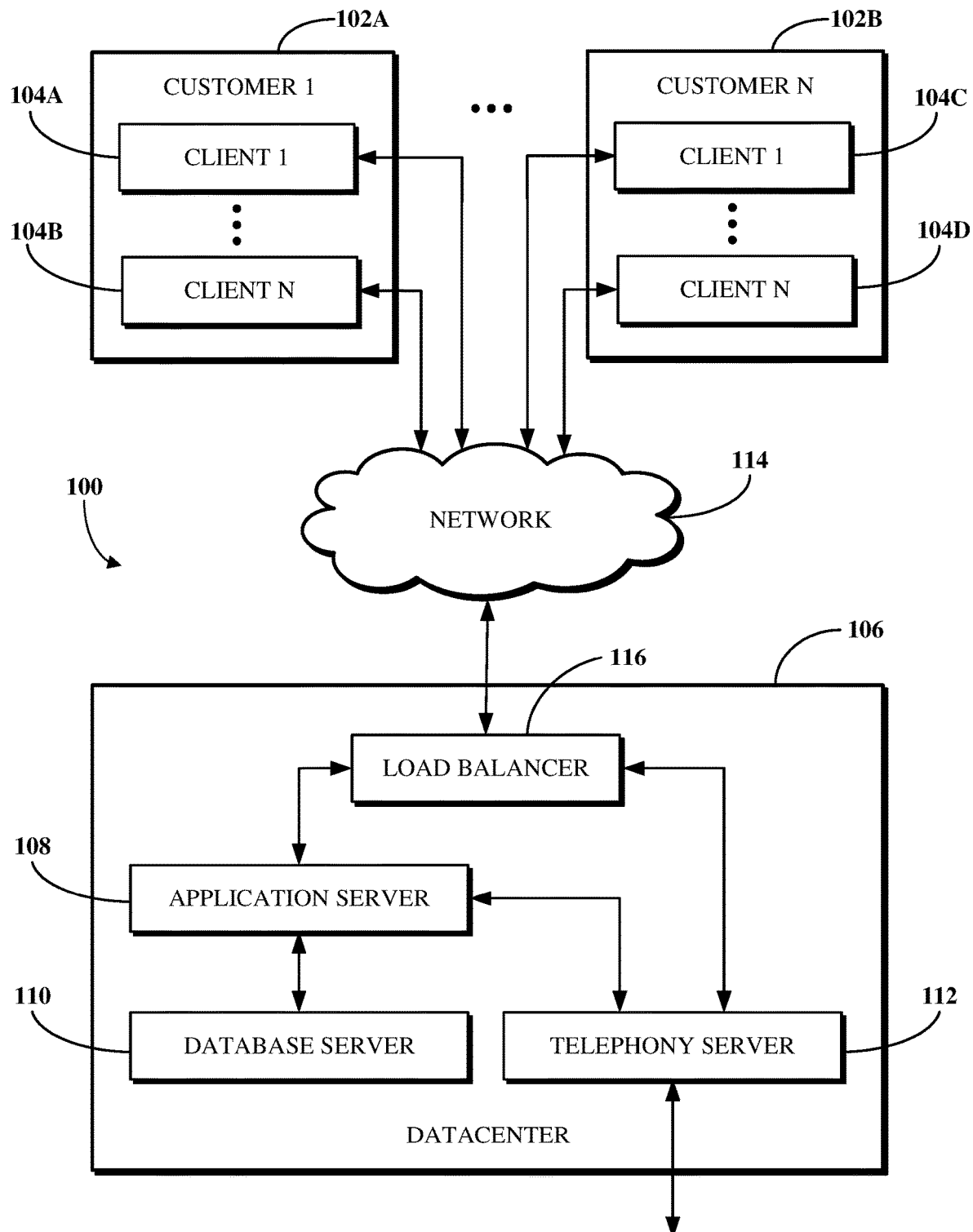
FIG. 1 is a block diagram of an example of an electronic computing and communications system.

It is common for conference participants to lose focus at one or more times during a conference. For example, a conference participant may get an incoming message or alert unrelated to the conference which distracts him or her from the current conversation. In another example, a conference participant may believe that he or she is not related to the current conversation and decide to use time while others are discussing it to focus on a different task. This is true both for in-person conferences as well as conferences implemented over the Internet using conferencing software.

However, it is similarly common for conversations to change during a conference while a conference participant is not paying attention. For example, the topic at hand may shift at any moment from one with which the conference participant is not involved or familiar to one with which he or she is. In another example, the conference participant may be directly addressed by name, such as by a different participant asking him or her to provide their thoughts or other information on a given topic. In many such cases, it may be obvious to the other participants that the subject conference participant is not paying attention to the conversation for one or more reasons, such as by the conference participant not responding to a request or taking too long to respond to a request.

Furthermore, a conference participant attending a conference implemented over software may be away from the device he or she is using to access the conference or may have their audio output muted such that he or she does not notice when a topic shift occurs or when his or her name is being spoken. In many cases, if a topic shift as described above happens or if his or her name is spoken, the conference participant may not know about it until after the conversation has changed. Conventional conferencing software services do not have safeguards for alerting participants as to events such as these. Accordingly, there is no current way for a conference participant to be alerted when he or she is not focused on the conference conversation, but is being asked something by another conference participant or where a topic relevant to him or her is being discussed.

Implementations of this disclosure address problems such as these using conference event alerting based on participant focus. A conference participant is alerted as to an event associated with the conference participant during a conference responsive to determining that a focus of the conference participant is other than on the conference. During the conference, an event associated with the conference participant is detected based on a real-time transcription of the conference. For example, the event may relate to a topic relevant to the conference participant or a request associated with a name of the conference participant. A determination is made that a focus of the conference participant is other than on the conference based on information associated with a device of the conference participant, such as input received from a camera associated with the device or a setting of an audio output device associated with the device. Based on that determination and the detected event, output is presented to alert the conference participant as to the event.

To describe some implementations in greater detail, reference is first made to examples of hardware and software structures used to implement a system for conference event alerting based on participant focus. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
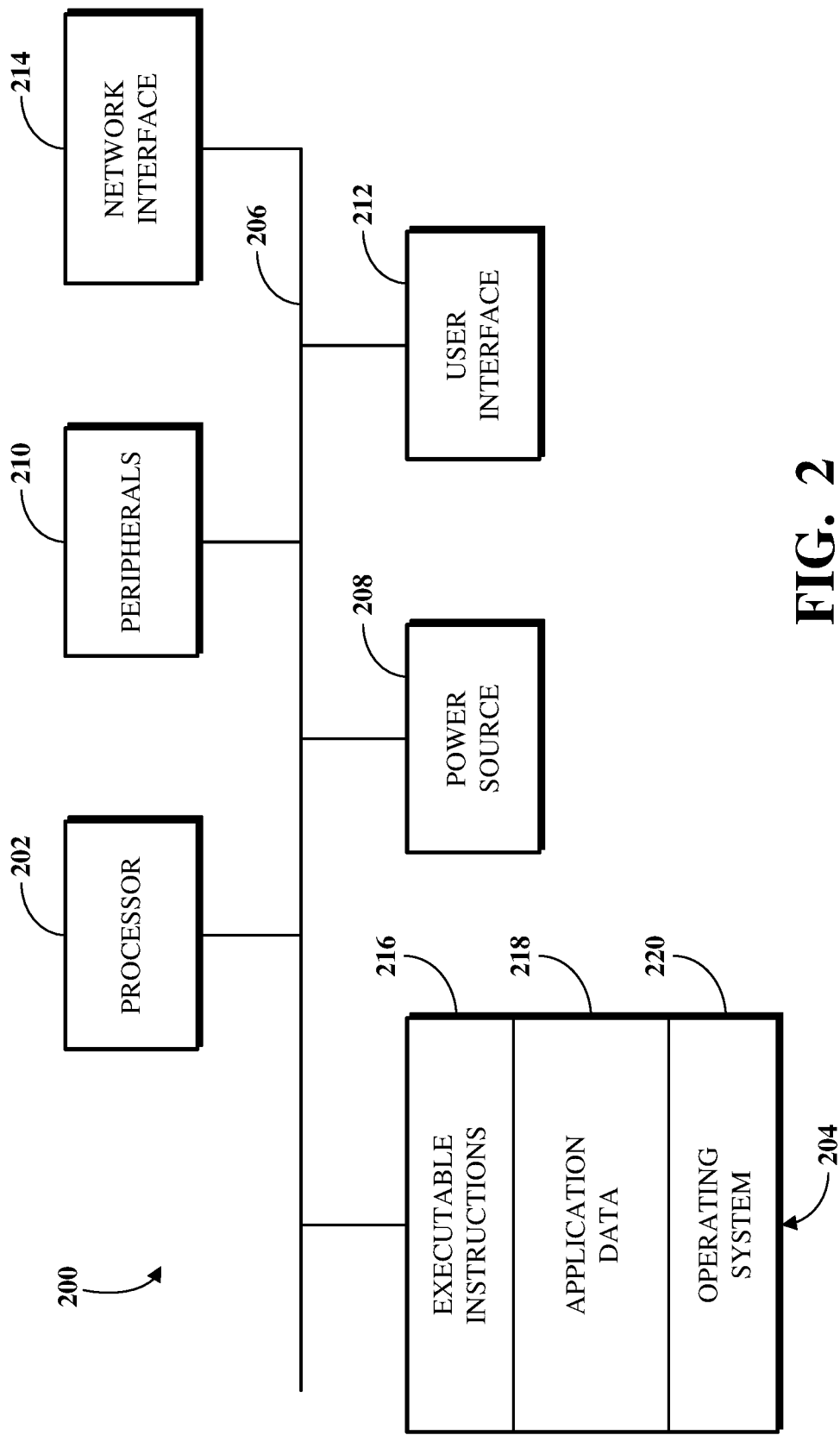
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
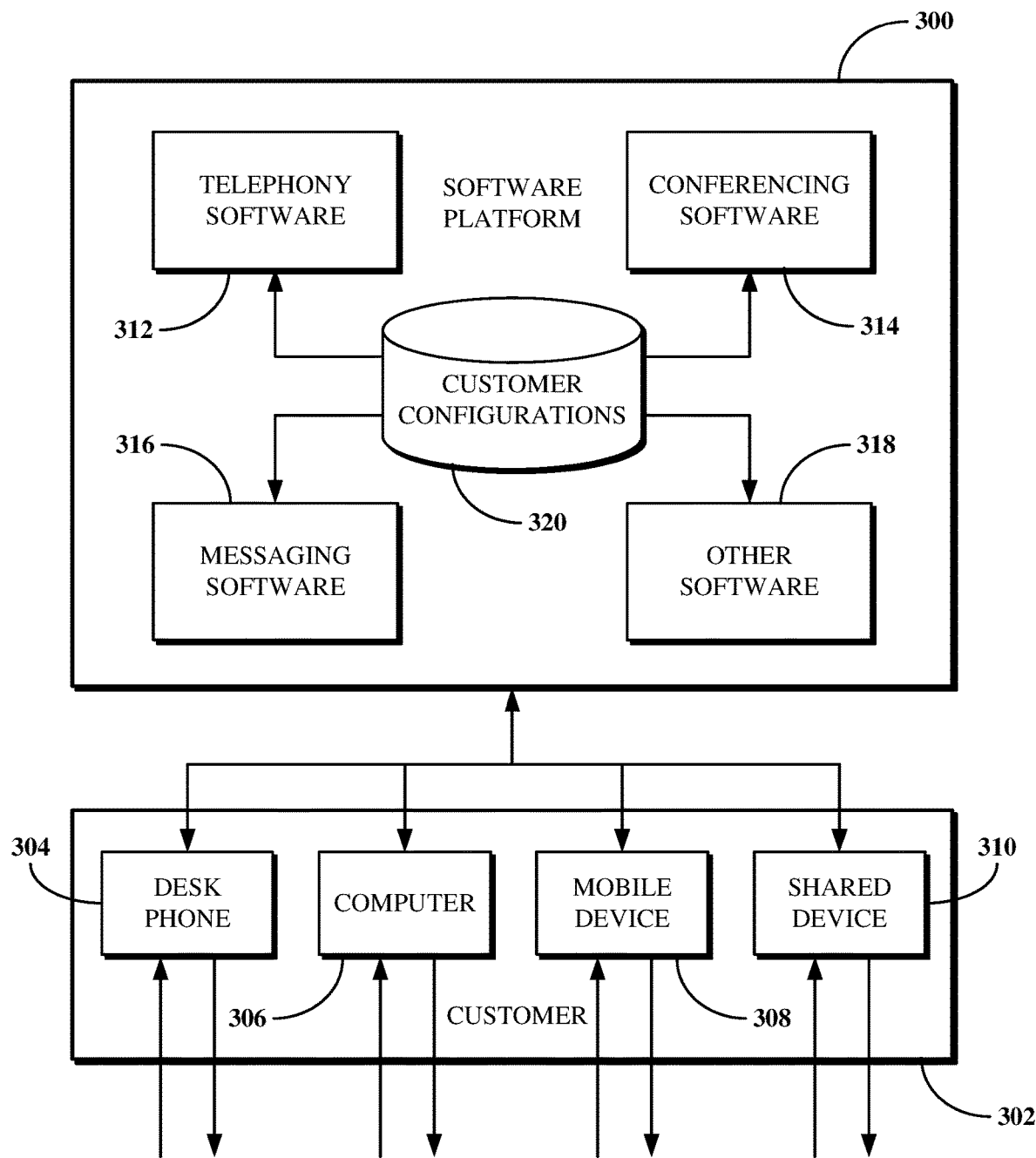
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include event alerting software for detecting an event associated with a conference participant during a conference based on a real-time transcription of the conference and presenting output to alert the conference participant as to the event responsive to determining that a focus of the conference participant is other than on the conference based on information associated with a device of the conference participant.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
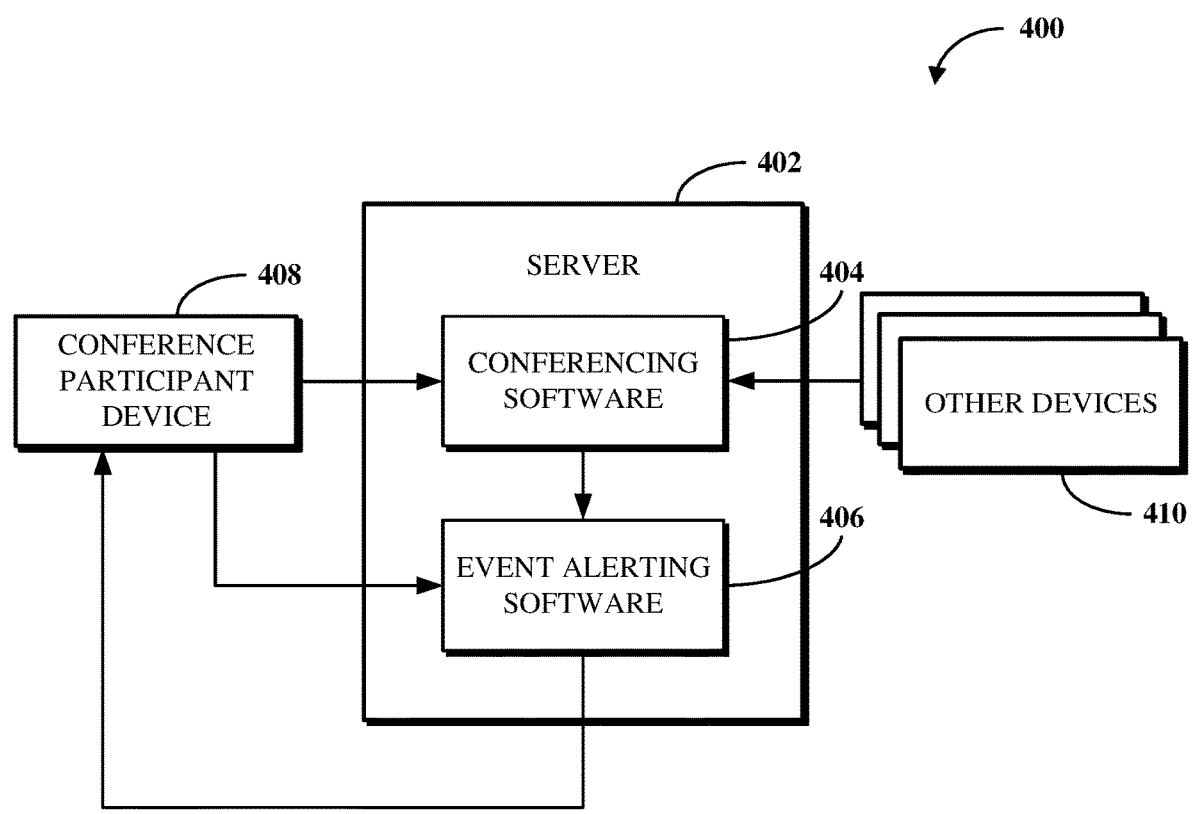
FIG. 4 is a block diagram of an example of a system for conference event alerting based on participant focus.

FIG. 4 is a block diagram of an example of a system 400 for conference event alerting based on participant focus. The system 400 includes a server 402 which runs conferencing software 404 and event alerting software 406. The conferencing software 404 implements a conference between operators of multiple devices and may, for example, be the conferencing software 314 shown in FIG. 3. As shown, the conferencing software 404 implements a conference between an operator of a conference participant device 408 and operators of one or more other devices 410. Each of the conference participant device 408 and the other devices 410 may be a client device such as one of the clients 304 through 310 shown in FIG. 3 or a non-client device which accesses the conferencing software 404 other than by using a client application.

The event alerting software 406 interfaces with the conferencing software 404 to detect events occurring during a conference implemented by the conferencing software 404. In particular, the event alerting software 406 monitors a conversation between participants of the conference implemented by the conferencing software 404, such as using a real-time transcription of the conference, to detect an event associated with a conference participant. The event alerting software 406 then uses information associated with a device of that conference participant to determine whether a focus of that conference participant is on the conference. Based on such determination, the event alerting software 406 may present output to alert the conference participant as to the event. The event alerting software 406 may, for example, be the event alerting software referred to above with respect to the other software 318 shown in FIG. 3. In some implementations, the conferencing software 404 may include the event alerting software 406. In some implementations, the conferencing software 404 and the event alerting software 406 may wholly or partially run on different servers.

Each device which is connected to the conferencing software 404 also communicates with the event alerting software 406. In particular, as shown, the event alerting software 406 both receives data from and transmits data to the conference participant device 408. The data received at the event alerting software 406 from the conference participant device 408 includes information usable to determine whether a focus of an operator of the conference participant device 408, who may also be referred to as a conference participant, is other than on the conference implemented by the conferencing software 404. The data transmitted from the event alerting software 406 to the conference participant device 408 includes instructions for alerting the operator of the conference participant device 408 as to an event associated with the operator of the conference participant device 408. The event is detected by the event alerting software 406 during the conference based on a determination that the focus of the operator of the conference participant device 408 is other than on the conference.

Figure 5:
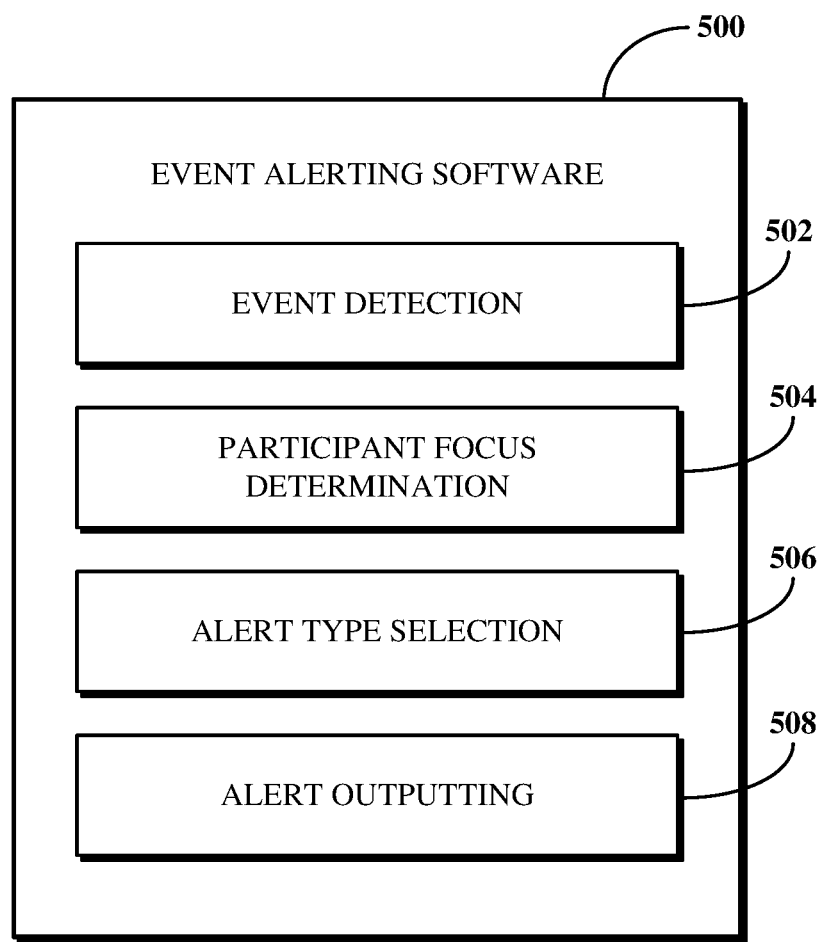
FIG. 5 is a block diagram of example functionality of event alerting software.

FIG. 5 is a block diagram of example functionality of event alerting software 500, which may, for example, be the event alerting software 406 shown in FIG. 4. The event alerting software 500 includes tools, such as programs, subprograms, functions, routines, subroutines, operations, and/or the like for detecting events associated with a conference participant during a conference and presenting alerts to indicate those events to those conference participants where a focus of those conference participants is determined to be other than on the conference. As shown, the event alerting software 500 includes an event detection tool 502, a participant focus determination tool 504, an alert type selection tool 506, and an alert outputting tool 508.

The event detection tool 502 detects an event associated with a conference participant during a conference based on a real-time transcription of the conference. The event thus is or refers to conversational content within the conference. For example, an event detectable using the event detection tool 502 may be or refer to a request naming the conference participant or a discussion of a topic relevant to the conference participant. The event detection tool 502 may obtain and use the real-time transcription of the conference, which may be generated by the event alerting software 500, the conferencing software, or other software, to detect the event. Alternatively, the event detection tool 502 may use output of a learning model trained for contextual content processing to detect the event. For example, the learning model, which may be a contextual machine learning model, may evaluate content of the real-time transcription to produce output. The output may, for example, identify a topic relevant to the conference participant or a request associated with a name of the conference participant.

The participant focus determination tool 504 determines that a focus of a conference participant is other than on the conference. The focus of the conference participant refers to a whole or partial focus of the conference participant. Thus, determining that the focus of the conference participant is other than on the conference includes determining that the conference participant likely appears to be at least partially focusing on something other than the conference. The participant focus determination tool 504 determines that the focus of the conference participant is other than on the conference based on information associated with a device of the conference participant. In particular, the device is the device used by the conference participant to connect to the conference. The information associated with the device of the conference participant may, for example, refer to input received from a camera of the device of the conference participant or a setting of an audio output device associated with the device.

In one example, the participant focus determination tool 504 can determine based on input received from the camera of the device of the conference participant that the conference participant is not located in front of the camera when the event is detected. In such a case, the participant focus determination tool 504, or another tool or other software aspect, may perform object detection to determine whether a human object is detectable within a video feed obtained from the camera of the device. Where a human object is not detectable within the video feed, the participant focus determination tool 502 determines that the conference participant is not located in front of the camera and thus that the conference participant is not at the device. The participant focus determination tool 504 accordingly determines that the focus of the conference participant is other than on the conference.

In another example, the participant focus determination tool 504 can determine based on input received from the camera of the device of the conference participant that the conference participant is looking other than at conferencing software implementing the conference at the device when the event is detected. In such a case, the participant focus determination tool 504 may estimate a gaze direction of the conference participant based on a perceived angle of his or her eyes and then estimate whether that gaze direction overlaps with a perceived location of the device. In one example, estimating whether the gaze direction overlaps with the perceived location of the device can include using a camera on or otherwise coupled to the device of the conference participant to determine whether a face of the conference participant is facing toward the camera. In another example, where the device of the conference participant is a computing device to which multiple displays are coupled, estimating whether the gaze direction overlaps with the perceived location of the device can include determining whether the face of the conference participant is pointing toward a display at which the conferencing software is presently in the foreground.

In yet another example, the participant focus determination tool 504 can determine based on input received from or a setting of the camera of the device of the conference participant that the camera is off when the event is detected. In such a case, the participant focus determination tool 504 may assume that a focus of the conference participant is at least partially other than on conference. The input received from may indicate that the camera is off where no video feed is being received or where the frames of the video feed are all black. The setting of the camera may indicate that video input from the camera for the conference has been disabled.

In still another example, the participant focus determination tool 504 can determine based on a setting of an audio output device associated with the device of the conference participant that the conference participant is unable to hear audio content of the conference and thus that the focus of the conference participant is other than on the conference. The audio output device may, for example, be headphones or speakers of or coupled to the device of the conference participant. The setting may indicate that the audio output device is muted when the event is detected. The participant focus determination tool 504, or another tool or software aspect, may use permissions granted from the device of the conference participant to monitor the setting of the audio output device, whether on a periodic basis or in response to the detection of an event associated with the conference participant. For example, the permissions may be operating system-level permissions enabling interactions with an operating system of the device of the conference participant.

In still another example, the participant focus determination tool 504 can determine based on a background state of the conferencing software on the device of the conference participant that the focus of the conference participant is other than on the conference. The participant focus determination tool 504, or another tool or software aspect, may use permissions granted from the device of the conference participant to determine whether the conferencing software is in a foreground of a display of the device of the conference participant. For example, the permissions may be operating system-level permissions enabling interactions with an operating system of the device of the conference participant. Where the conferencing software is determined to be other than in the foreground of the display of the device of the conference participant, the participant focus determination tool 504 determines that the conferencing software is in a background state and thus that the conference participant is paying partial or full attention to something else at the device.

The participant focus determination tool 504 determines that the focus of the conference participant is other than on the conference in response to the event detection tool 512 detecting the event. Thus, the event alerting software 500 may refrain from expending resources on determining the focus of the conference participant using the participant focus determination tool 504 until after an event associated with the conference participant is detected. However, in some implementations, the participant focus determination tool 504 may determine that the focus of the conference participant is other than on the conference before the event detection tool 512 detects the event or concurrently with the detection of the event by the event detection tool 512. For example, the participant focus determination tool 504 may determine that the focus of the conference participant is other than on the conference at a given time during the conference based on information associated with the device of the conference participant. The participant focus determination tool 504 may then check after the event is detected to determine whether that same conference participant has returned focus to the conference.

The alert type selection tool 506 selects a type of alert to be output to the conference participant based on the detection of an event associated with the conference participant by the event detection tool 502 and based on a determination by the participant focus determination tool 504 that the focus of the conference participant is other than on the conference. In particular, the type of alert selected by the alert type selection tool 506 will be used to alert the conference participant as to the detected event based on the determination that his or her focus is other than on the conference. The type of alert is selected based on the type of information associated with the device which was used by the participant focus determination tool 504 to determine that the focus of the conference participant is other than on the conference. For example, where the information associated with the device of the conference participant includes or refers to input from a camera of the device indicating that a gaze of the conference participant is other than toward a display outputting the conference, the alert type selection tool 506 may select an audio or visual alert type. In another example, where the information associated with the device of the conference participant includes or refers to input from a camera of the device indicating that the conference participant is not in front of the device, the alert type selection tool 506 may select an audio alert type. In yet another example, where the information associated with the device of the conference participant includes or refers to input from or a setting of a camera of the device indicating that the camera is off, the alert type selection tool 506 may select an audio alert type. In still another example, where the information associated with the device includes or refers to a setting of an audio output device associated with the device of the conference participant, such as a muted status of headphones or speakers used with the device, the alert type selection tool 506 may select a visual alert type.

The alert outputting tool 508 causes a presentation of output to the conference participant to alert the conference participant as to the detected event according to the alert type selected by the alert type selection tool 506. Generally, the alert outputting tool 508 outputs instructions, commands, or other information configured to cause the device of the conference participant to output information indicative of the detected event or otherwise indicative of something requiring the attention of the conference participant. However, in some cases, the alert outputting tool 508 outputs those instructions, commands, or other information to a secondary device associated with the conference participant. For example, where the information associated with the device and used to determine that the focus of the conference participant is other than on the conference includes input from a camera of the device indicating that the conference participant is not in front of the device, the alert outputting tool 508, based on an assumption that the conference participant may not be near enough to the device to perceive the outputted alert, causes the secondary device to output the alert. In some implementations, the alert outputting tool 508 causes both the device of the conference participant and the secondary device to present the output to indicate the alert to the conference participant. In some cases, the alert outputting tool 508 may either output or cause another software aspect to output a summary of the detected event, such as using a real-time transcription of a conversation within a window of time preceding and through the detection of the event. For example, a text summary of the subject conversation or the all or a portion of the actual transcribed conversation may be output to the conference participant for use in addressing the alerted event. In some cases, the text summary may represent a key discussion topic associated with the detected event.

Although the tools 502 through 508 are shown as functionality of the event alerting software 500 as a single piece of software, in some implementations, some or all of the tools 502 through 508 may exist outside of the event alerting software 500 and/or the software platform may exclude the event alerting software 500 while still including the some or all of tools 502 through 508 in some form elsewhere.

Figure 6:
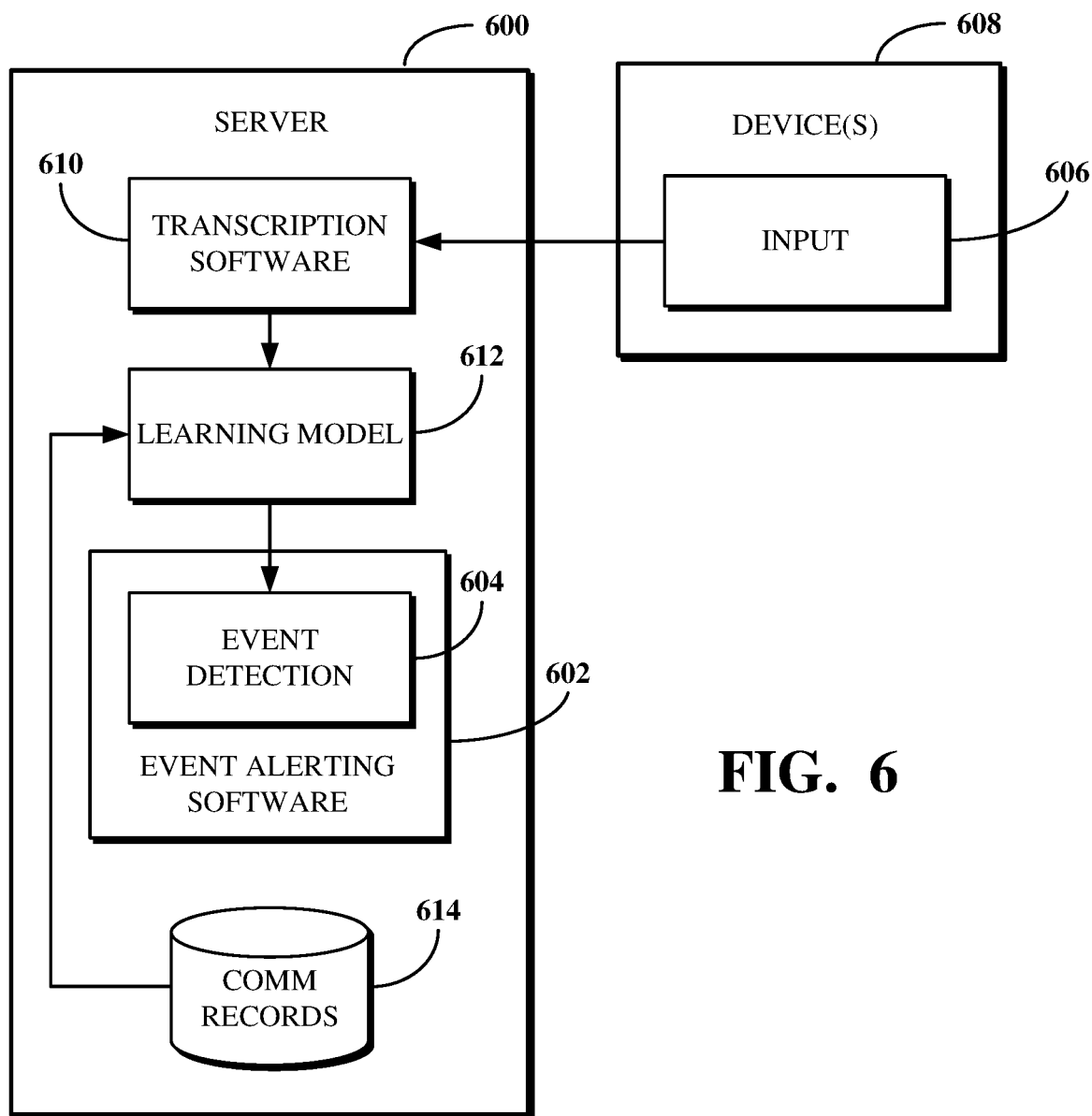
FIG. 6 is a block diagram of an example of event detection based on input received from devices connected to a conference.

FIG. 6 is a block diagram of an example of event detection based on input received from devices connected to a conference. As shown, a server 600 runs event alerting software 602 which includes an event detection tool 604. The event detection tool 604 detects an event associated with a conference participant during a conference based on input 606 received from one or more devices 608 connected to the conference. For example, the server 600, the event alerting software 602, and the one or more devices 608 may respectively be the server 402, the event alerting software 406, and the one or more other devices 410 shown in FIG. 4. In another example, the event detection tool 604 may be the event detection tool 502 shown in FIG. 5.

In particular, the one or more devices 608 include or otherwise refer to devices other than a conference participant device (e.g., the conference participant device 408 shown in FIG. 4) of a conference participant with whom the event detected by the event detection tool 604 is associated. As such, the input 606 received from the one or more devices 608 is received other than from the conference participant device. The input 606 includes audio information captured over one or more audio channels between the devices 608 and conferencing software which implements the conference (e.g., the conferencing software 404 shown in FIG. 4).

The input 606 is processed using transcription software 610 to generate a real-time transcription of the conference. In particular, the real-time transcription is generated in real-time concurrently with the conference based on real-time conversations occurring within the conference. Thus, the real-time transcription may not be considered fully generated until after a final conversation during the conference has been completed. Accordingly, generating the real-time transcription includes or refers to generating a portion of the real-time transcription corresponding to a current conversation occurring at a given time during the conference. The transcription software 610 may, for example, be or refer to an automated speech recognition engine configured to access the conference.

The real-time transcription generated by the transcription software 610 is next processed using a learning model 612 to determine that content of the real-time transcription relates to an event associated with a conference participant of the conference. The learning model 612 may be or include a neural network (e.g., a convolutional neural network, recurrent neural network, or other neural network), decision tree, vector machine, Bayesian network, genetic algorithm, deep learning system separate from a neural network, or another machine learning model. The learning model 612 is trained to recognize content and context of conversations. For example, the learning model 612 may be a contextual learning model which is trained to evaluate the content of the real-time transcription generated by the transcription software 610, to identify a topic relevant to the conference participant and/or a request associated with a name of the conference participant.

In particular, to identify a request associated with a name of the conference participant, the learning model 612 evaluates instances of the name of the conference participant within the real-time transcription based on a context thereof to determine when such an instance is associated with a request. A request associated with the name of the conference participant may, for example, relate to another participant asking the conference participant by name for input on some topic, such as to comment on something or provide information based on some conversation at hand. An example of an instance of the name of the conference participant which may not relate to a request relates to an instance in which the name of the conference participant is spoken without some ask attached to it. For example, one participant saying the name of the conference participant in passing or while telling a story may not amount to an identification of a request associated with the name of the conference participant.

Separately, to identify a topic relevant to the conference participant, the learning model 612 evaluates keywords and/or related content within the real-time transcription against historical communication records 614 associated with the conference participant to determine when such keywords and/or related content correspond to a topic about which the conference participant has historically communicated. The historical communication records 614 may, for example, correspond to one or more of chat messages, instant messages, text messages, emails, call transcripts, or conference transcripts associated with the conference participant. For example, the learning model 612 may search through the historical communication records 614 based on certain keywords and/or related content within the real-time transcription. Responsive to an identical match or a contextual match based on that search, the learning model 612 may determine that the subject keywords and/or related content correspond to a topic which is relevant to the conference participant. For example, where one or more of the historical communication records 614 describe a project, a codename, a work order, an activity, a location, a team, or another aspect which has also been detected by the learning model 612 as having been brought up for discussion during the conference, such as based on a context and the content of the real-time transcription, the learning model 612 can identify that as a topic relevant to the conference participant.

In some implementations, one or both of the transcription software 610 or the learning model 612 may be included in the event alerting software 602. In some implementations, the historical communication records 614 may be located other than on the server 600 on which the event alerting software 602 is partially or wholly run.

Figure 7:
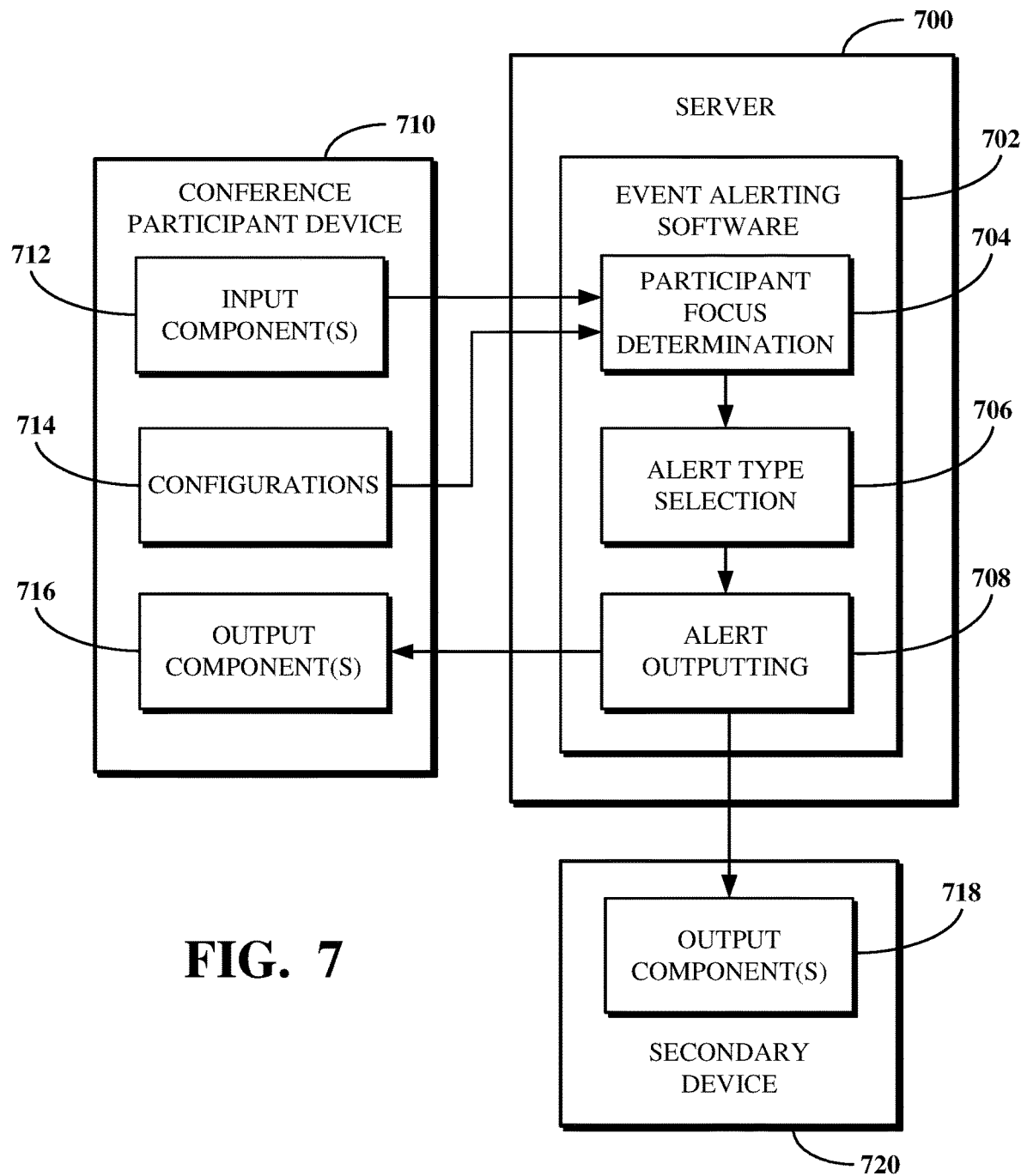
FIG. 7 is a block diagram of an example of participant focus determination and alert outputting in connection with an event detected during a conference.

FIG. 7 is a block diagram of an example of participant focus determination and alert outputting in connection with an event detected during a conference. As shown, a server 700 runs event alerting software 702 which includes a participant focus determination tool 704, an alert type selection tool 706, and an alert outputting tool 708. The participant focus determination tool 604 determines that a focus of a conference participant is other than on a conference. The alert type selection tool 706 selects an alert type to use to indicate a detected event associated with the conference participant. The alert outputting tool 708 outputs an alert to indicate the detected event according to the alert type. For example, the server 700 may be the server 402 shown in FIG. 4 or the server 600 shown in FIG. 6, to the extent different. In another example, the event alerting software 702 may be the event alerting software 406 shown in FIG. 4 or the event alerting software 602 shown in FIG. 6, to the extent different. In yet another example, the participant focus determination tool 704, the alert type selection tool 706, and the alert outputting tool 708 may respectively be the participant focus determination tool 504, the alert type selection tool 506, and the alert outputting tool 508 shown in FIG. 5.

In particular, the participant focus determination tool 704 determines that a focus of the conference participant is other than on a conference based on information associated with a conference participant device 710, which is a device used by the conference participant to connect to the conference. For example, the participant focus determination tool 704 may use input received from one or more input components 712 of the conference participant device 710 and/or one or more configurations 714 of the conference participant device 710 to determine that the focus of the conference participant is other than on the conference.

The input components 712 are or refer to components of the conference participant device 710 which are configured to capture input in one or more modalities. For example, the input components 712 may include a camera of the conference participant device 710, such as a built-in camera or a camera coupled by a wired or wireless connection. The configurations 714 are or refer to settings of the conference participant device 710 and/or devices associated therewith. For example, the configurations may include a setting of an audio output device, such as headphones or speakers of or otherwise connected to the conference participant device 710, or an indication of a software aspect within a foreground of a display of the conference participant device 710.

The alert type selection tool 706 selects an alert type to use to present output alerting the conference participant as to an event detected by the event alerting software 702 (e.g., by the event detection tool 502 shown in FIG. 5 or the event detection tool 604 shown in FIG. 6, to the extent different). In particular, the alert type selection tool 706 selects the alert type using information from the participant focus determination tool 704 indicating the information associated with the conference participant device 710 which was used to determine that the focus of the conference participant is other than on the conference.

The alert outputting tool 708 then causes a presentation of output to alert the conference participant as to the detected event according to the alert type selected by the alert type selection tool 706. In particular, the alert outputting tool 708 transmits instructions, commands, or other information configured to present output alerting the conference participant as to the detected event to one or more output components 716 of the conference participant device 710. The output components 716 may, for example, include a display, a vibrational component, and/or an audio output device associated with the conference participant device 710. In some implementations, the alert outputting tool 708 may transmit instructions, commands, or other information configured to present output alerting the conference participant as to the detected event to one or more output components 718 of a secondary device 720 associated with the conference participant. For example, the secondary device 720 may be another device through which the conference participant has accessed conferencing software used to implement the conference. In another example, the secondary device 720 may be another device registered to an account of the conference participant. In yet another example, the secondary device 720 may be another device detected on a same network to which the conference participant device 710 is connected. The output components 718 may, for example, include a display, a vibrational component, and/or an audio output device associated with the secondary device 720. The secondary device 720 may be a mobile device, such as a laptop, tablet, or mobile phone, or it may be a wearable device, such as a network-connected wristband, ring, or watch.

The alert presented at the output components 716 and/or the output components 718 can take one of several forms. For example, the form of the alert may be configured using a client application running at the conference participant device 710 or the secondary device 718. The alert may be configured to output audio content and/or vibrational content, such as a unique sound and/or vibrational pattern to grab the attention of the conference participant. Alternatively, the alert may be configured to output visual content, such as imagery, text, flashing content, or the like to grab the attention of the conference participant. As a further alternative, the alert may be configured to output audio, vibrational, and/or visual content. The particular type of content output as the alert or a portion thereof is based on the alert type selected by the alert type selection tool 706. In some cases, the alert presented at the output components 716 and/or the output components 718 may include a summary of the detected event, such as which may be produced based on a real-time transcription of a conversation within a window of time preceding and through the detection of the event. For example, a text summary of the subject conversation or the all or a portion of the actual transcribed conversation may be included in the alert. In some cases, the text summary may represent a key discussion topic associated with the detected event.

Figure 8:
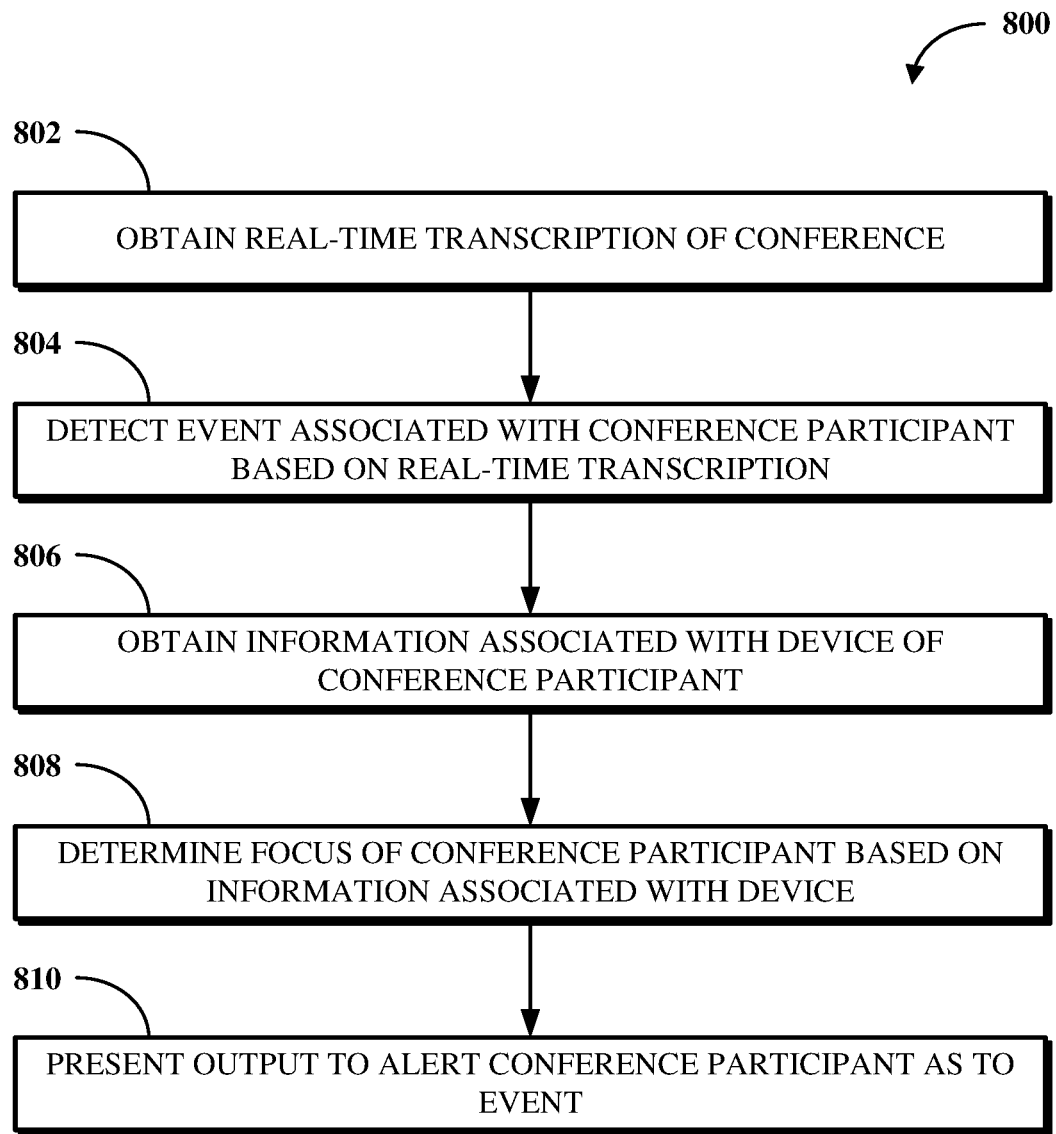
FIG. 8 is a flowchart of an example of a technique for conference event alerting based on participant focus.

To further describe some implementations in greater detail, reference is next made to examples of techniques which may be performed by or using a system for conference event alerting based on participant focus. FIG. 8 is a flowchart of an example of a technique 800 for conference. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a real-time transcription of a conference is obtained. Obtaining the real-time transcription may include generating the real-time transcription. Alternatively, obtaining the real-time transcription may include obtaining the real-time transcription from a software aspect which generates it. The real-time transcription is generated in real-time with a conversation occurring within a conference attended by multiple participants including a conference participant. At a given time, however, the real-time transcription does not include content spoken by the conference participant.

At 804, an event associated with a conference participant is detected based on the real-time transcription of the conference. Detecting the event associated with the conference participant during the conference based on the real-time transcription of the conference may include evaluating content of the real-time transcription using a contextual machine learning model to identify a request associated with a name of the conference participant. Alternatively, detecting the event associated with the conference participant during the conference based on the real-time transcription of the conference may include evaluating content of the real-time transcription using a contextual machine learning model to identify a topic relevant to the conference participant. For example, the topic may be determined to be relevant to the conference participant based on one or more historical communication records associated with the conference participant. The one or more historical communication records may, for example, correspond to one or more of a chat message, an instant message, a text message, an email, a call transcript, or a conference transcript. In another example, the topic is determined to be relevant to the conference participant based on one or more of organizational chart information or profile information associated with the conference participant.

At 806, information associated with a device of the conference participant is obtained. The information associated with the device of the conference participant includes input received from one or more input components of the device of the conference participant and/or configurations associated with the device of the conference participant. For example, the input component from which the information is received may be a camera of the device of the conference participant, in which case the information may relate to a video feed obtained from that camera. In another example, the configurations may refer to a setting of an audio output device associated with the device of the conference participant, in which case the information may relate to a muted status of the audio output device. In yet another example, the configurations may refer to a background status of the conferencing software implementing the conference on the device of the conference participant.

At 808, a focus of the conference participant is determined based on the information associated with the device of the conference participant. For example, where the information associated with the device of the conference participant includes input received from a camera of the device of the conference participant, the determination that the focus of the conference participant is other than on the conference may be responsive to determining based on the input received from the camera that the conference participant is not located in front of the camera when the event is detected. In another example, where the information associated with the device of the conference participant includes input received from a camera of the device of the conference participant, the determination that the focus of the conference participant is other than on the conference may be responsive to determining based on the input received from the camera that the conference participant is looking other than at conferencing software implementing the conference at the device when the event is detected. In yet another example, where the information associated with the device of the conference participant includes a setting of an audio output device associated with the device of the conference participant, the determination that the focus of the conference participant is other than on the conference may be responsive to determining based on the setting of the audio output device that the audio output device is muted when the event is detected.

At 810, output is presented to alert the conference participant as to the event. Based on the manner in which the focus of the conference participant is determined to be other than on the conference, the output may be or include one or more aspects. For example, the output may include one or more of a configurable sound or a configurable vibration. In another example, the output may include a visual indicator. In some implementations, presenting the output to alert the conference participant as to the event may include causing a secondary device associated with the conference participant to present the output. In some such implementations, the secondary device may be identified as part of the process for presenting the alert. The secondary device may be a mobile device or a wearable device. In some implementations, the output may include a summary of the detected event, such as which may be produced based on a real-time transcription of a conversation within a window of time preceding and through the detection of the event. For example, a text summary of the subject conversation or the all or a portion of the actual transcribed conversation may be included in the alert. In some cases, the text summary may represent a key discussion topic associated with the detected event.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    evaluating, using a machine learning model, content of a live transcription of a conference attended by a conference participant to determine a change in discussion during the conference to a topic associated with the conference participant, wherein the evaluated content corresponds other than to a name of the conference participant;
    determining, based on a focus of the conference participant being other than on the conference, an alert to output to the conference participant to indicate the change in discussion based on information obtained from a device of the conference participant; and
    causing an output of the alert to the conference participant, wherein the alert is an audio alert when it is determined that a camera of the device of the conference participant is off, and wherein the alert is a visual alert when it is determined that an audio output component of the device is muted.

2. The method of claim 1, wherein the information obtained from the device of the conference participant includes input from the camera of the device of the conference participant indicating that the conference participant is not located in front of the camera, the method comprising:
    determining that the focus of the conference participant is other than on the conference based on the input from the camera of the device of the conference participant.

3. The method of claim 1, wherein the information obtained from the device of the conference participant includes input from the camera of the device of the conference participant indicating that the conference participant is looking other than at a display of the device of the conference participant at which the conference is output for viewing, the method comprising:
    determining that the focus of the conference participant is other than on the conference based on the input from the camera of the device of the conference participant.

4. The method of claim 1, wherein the information obtained from the device of the conference participant includes a setting of an audio output component of the device of the conference participant, the method comprising:
    determining that the focus of the conference participant is other than on the conference based on the setting of the audio output component indicating that the audio output component is muted.

5. The method of claim 1, wherein the information obtained from the device of the conference participant includes information obtained from an operating system of the device of the conference participant, the method comprising:
    determining that the focus of the conference participant is other than on the conference based on the information obtained from the operating system indicating that conferencing software connecting the device of the conference participant to the conference is other than in a foreground of a display of the device of the conference participant.

6. The method of claim 1, comprising:
    determining that the topic is associated with the conference participant based on one or more communication records associated with the conference participant.

7. The method of claim 1, comprising:
    determining that the topic is associated with the conference participant based on one or more of organizational chart information or profile information associated with the conference participant.

8. The method of claim 1, wherein the alert includes one or more of a sound, a vibration, or a visual indicator and causing the output of the alert to the conference participant comprises:
    causing the device of the conference participant to output the one or more of the sound, the vibration, or the visual indicator.

9. The method of claim 1, wherein causing the output of the alert to the conference participant comprises:
    causing a secondary device associated with the conference participant to output the alert.

10. A non-transitory computer readable medium storing instructions operable to cause one or more processors to perform operations comprising:
    evaluating, using a machine learning model, content of a live transcription of a conference attended by a conference participant to determine a change in discussion during the conference to a topic associated with the conference participant, wherein the evaluated content corresponds other than to a name of the conference participant;
    determining, based on a focus of the conference participant being other than on the conference, an alert to output to the conference participant to indicate the change in discussion based on information obtained from a device of the conference participant; and
    causing an output of the alert to the conference participant, wherein the alert is an audio alert when it is determined that a camera of the device of the conference participant is off, and wherein the alert is a visual alert when it is determined that an audio output component of the device is muted.

11. The non-transitory computer readable medium of claim 10, wherein when the information obtained from the device of the conference participant includes input from the camera of the device of the conference participant indicating that a gaze of the conference participant is other than toward a display outputting the conference, the alert is both an audio alert and a visual alert.

12. The non-transitory computer readable medium of claim 10, wherein the topic is determined to be associated with the conference participant based on one or both of a communication record associated with the conference participant, organizational chart information associated with the conference participant, or profile information associated with the conference participant.

13. The non-transitory computer readable medium of claim 10, wherein the information is obtained via a client application configured to connect the device of the conference participant to one or more software services of a unified communications as a service platform.

14. An apparatus, comprising:
a memory; and
a processor configured to execute instructions stored in the memory to:
evaluate, using a machine learning model, content of a live transcription of a conference attended by a conference participant to determine a change in discussion during the conference to a topic associated with the conference participant, wherein the evaluated content corresponds other than to a name of the conference participant;
determine, based on a focus of the conference participant being other than on the conference, an alert to output to the conference participant to indicate the change in discussion based on information obtained from a device of the conference participant; and
cause an output of the alert to the conference participant, wherein the alert is an audio alert when it is determined that a camera of the device of the conference participant is off, and wherein the alert is a visual alert when it is determined that an audio output component of the device is muted.

15. The apparatus of claim 14, wherein the information obtained from the device of the conference participant includes a video feed obtained from the camera of the device of the conference participant, and wherein the processor is configured to execute the instructions to:
perform object detection against one or more images of the video feed to determine whether a human object is detectable within the video feed.

16. The apparatus of claim 14, wherein the information obtained from the device of the conference participant includes a video feed obtained from the camera of the device of the conference participant, and wherein the processor is configured to execute the instructions to:
estimate, based on the video feed, a gaze direction of the conference participant based on a perceived angle of eyes of the conference participant; and
estimate whether the gaze direction overlaps with a perceived location of the device of the conference participant.

17. The apparatus of claim 14, wherein the focus of the conference participant is determined as being other than on the conference before the change in discussion is determined.

18. The apparatus of claim 14, wherein the focus of the conference participant is determined as being other than on the conference after the change in discussion is determined.

19. The apparatus of claim 14, wherein the information obtained from the device of the conference participant includes input from the camera of the device of the conference participant indicating that the conference participant is not located in front of the camera, and wherein the processor is configured to execute the instructions to:
cause a secondary device associated with the conference participant to output the alert.

20. The apparatus of claim 14, wherein the processor is configured to execute the instructions to:
cause a secondary device associated with the conference participant to output the alert as an audio alert when it is determined that the camera of the device of the conference participant is on and the participant is not located in front of the camera.

* * * * *